(12) United States Patent
Collier et al.

(10) Patent No.: US 6,823,122 B2
(45) Date of Patent: Nov. 23, 2004

(54) P-SI ER FIBER PROFILE

(75) Inventors: Adam K Collier, Elmira, NY (US); Grant D Cunningham, Painted Post, NY (US); Gang Qi, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 140 days.

(21) Appl. No.: 10/061,935

(22) Filed: Jan. 31, 2002

(65) Prior Publication Data

US 2003/0142937 A1 Jul. 31, 2003

(51) Int. Cl.[7] .................................................. G02B 6/16
(52) U.S. Cl. ...................................... 385/123; 386/142
(58) Field of Search ................................ 385/123–127, 385/141, 142, 144; 359/341.1, 349.5

(56) References Cited

U.S. PATENT DOCUMENTS

| | | | | |
|---|---|---|---|---|
| 4,257,797 | A | | 3/1981 | Andrejco et al. .............. 65/3 A |
| 6,118,575 | A | * | 9/2000 | Grubb et al. ................ 359/337 |
| 6,263,003 | B1 | * | 7/2001 | Huang et al. ................... 372/6 |
| 6,463,201 | B2 | * | 10/2002 | Aiso et al. ................... 385/123 |
| 2001/0055456 | A1 | * | 12/2001 | Ellison et al. ............... 385/127 |
| 2002/0018630 | A1 | * | 2/2002 | Richardson et al. ......... 385/127 |
| 2002/0172485 | A1 | * | 11/2002 | Keaton et al. .............. 385/127 |

OTHER PUBLICATIONS

"Fabrication and Characterization of $Yb^{3+}:Er^{3+}$ Phosphosilicate Fibers for Lasers" Vienne, Guillaume et al. Journal of Lightwave Technology, vol. 16, No. 11, Nov. 1998, p. 1990–2001.

"Optical Amplification Characteristics around 1.58 μm of Silica–based Eribium–Doped Fibers Containing Phosphorous/Alumina as Codopants" Kakui, Motoki et al. OSA TOPS vol. 25 Optical Amplifiers and Their Applications, 1998. p. 68–71.

"Optical Amplifers based on Phosphorous Codoped Rare–earth–doped Optical Fibres", R.A. Betts et al., International Journal of Optoelectronics, 1991, vol. 6, Nos. 1/2, 47–64.

* cited by examiner

*Primary Examiner*—John D. Lee
*Assistant Examiner*—Sarah U Song
(74) *Attorney, Agent, or Firm*—Svetkana Z. Short

(57) ABSTRACT

An optical fiber for signal amplification comprises a core, doped with at least 15% phosphorus by weight and a rare earth ion sufficient to provide amplification of an optical signal. The fiber also comprises a clad layer surrounding the core with an inner portion and an outer portion. The refractive index of the inner portion of the clad layer is lower than that at the outer radius of the core region. This depressed inner clad portion serves to confine electromagnetic radiation within a selected wavelength range to substantially only the core.

25 Claims, 4 Drawing Sheets

P-SI ER FIBER PROFILE

BACKGROUND OF THE INVENTION

1. Field of the Invention

This invention generally relates to the field of optical fibers, and more particularly to a refractive index profile of a phosphorus and rare earth doped fiber.

2. Description of the Related Art

Rare earth doped fiber, such as Ytterbium (Yb) or Erbium (Er) doped fiber is widely used as gain media for optical amplifiers. For example, most communication wavelength bands are determined by the Er gain wavelength. With bandwidth demand increasing exponentially, using the entire Er band has been viewed as an urgent and cost effective approach to meet the high demand for bandwidth.

Phosphorus-doped Er (P—Si Er) fiber has been demonstrated to extend the amplification of the fiber to 1620 nm. This is shown, for example in the article entitled "Optical Amplification Characteristics around 1.58 μm of Silica-Based Erbium-Doped Fibers Containing Phosphorous/Alumina as Codopants", by Kakui et al. The five valence phospotus P ion creates a local crystal field which interacts with Er F-shell electrons and reduces the Er excited state absorption probability and in turn extends the gain to longer wavelengths, such as 1620 nm. In the P—Si Er fiber, $P_2O_5$ not only contributes to the gain in the long wavelength, but it also gives the fiber necessary waveguide properties, by affecting the refractive index of the core. However, $P_2O_5$ has a high vapor pressure, which imposes two limitations on the P—Si profile: a low index (<1%) and centerline burnout.

P—Si Er fibers fabricated using standard Modified Chemical Vapor Deposition (MCVD) processes are well known in the art. In this process, the dopants, in gaseous form, are caused to flow into one end of a silica tube. The tube is then heated to ignite the chemicals and cause a reaction forming small glass particles known as "soot," which is deposited onto the inner surface of the tube. The tube is heated to sinter the particles to form layers of glass corresponding to the core and the cladding of the fiber. This process of soot deposition and sintering is repeated until the desired glass material is formed. The tube is then collapsed under reduced heat conditions to form a glass rod from which an optical fiber can be drawn.

Unfortunately, there is extensive diffusion of phosphorus into the clad layers and significant evaporation of phosphorus from the inner surface of the tube during the collapse stage of MCVD. The result is a sizeable dip ("centerline dip") in the concentration of phosphorus along the center of the core. With a lower phosphorus concentration in the core center, there is a considerable dip in the refractive index along the centerline of the core. This centerline dip can reduce mode confinement in the core and thus decrease the overlap between Er ions and optical pump power.

One method developed in an attempt to solve this problem is a partial collapse step in the MCVD process. See R. A. Betts et al., "Optical Amplifiers Based On Phosphorous Co-doped Rare-earth-doped Optical Fibres", International Journal of Optoelectronics, Vol. 6, Nos. 1/2, pp. 47–64. However, this is only a partial solution resulting in a fiber with only a slightly less drastic centerline dip. Accordingly, it would be desirable to provide a fiber structure which can compensate for the centerline dip in the refractive index for phosphorus- and rare earth-doped fibers used for optical amplification.

SUMMARY OF THE INVENTION

These and other drawbacks and limitations of conventional phosphorus- and rare earth-doped fiber for optical amplification are overcome according to exemplary embodiments wherein a fiber with a depressed inner cladding is provided. Instead of removing the centerline dip, the depressed inner cladding compensates for the centerline dip.

According to one embodiment of the present invention, an optical fiber for signal amplification comprises a core, doped with at least 15% phosphorus by weight and at least one rare earth ion sufficient to provide amplification of an optical signal, having a center axis. The optical fiber also comprises a clad layer, surrounding the core, having an axis collinear with the center axis of the core. The clad layer has an inner portion adjacent to the outer periphery of the core, and an outer portion. The inner portion can have an inner radius $r_1$, preferably in the range of 2 μm to 6 μm, and an outer radius $r_2$, the difference between which is preferably in the range of $2r_1$ to $5r_1$. The refractive index of the inner portion is less than the refractive index at the outer periphery of the core, so that the difference in the refractive index at the outer periphery of the core and the clad layer is sufficient to confine electromagnetic field within a selected wavelength range substantially only to the core. Preferably, the outer portion has a refractive index that is larger than the refractive index of the inner portion. Also preferably, the phosphorus dopant in the core is at least 20% by weight.

In a preferred aspect of this embodiment, the refractive index of the inner portion of the clad layer is in the range of 1.430 to less than 1.444 at 1550 nm. More preferably, the refractive index of the inner portion is between 1.440 and 1.442. Most preferably, the refractive index of the inner portion is about 1.441.

In another preferred aspect of this embodiment, the at least one rare earth ion includes erbium and preferably the optical fiber contains 0.2 to 0.4% of $Er_2O_3$ in the core by weight. The at least one rare earth ion can also include ytterbium. Also preferably the refractive index of the core is lowest along the center axis and initially increases with radial distance from the center axis. Also preferably, the concentration of phosphorus in the core is lowest along the center axis and initially increases with radial distance from the center axis.

In another preferred aspect of this embodiment, the selected wavelength range can be about 1560 nm to about 1640 nm.

According to another embodiment of the present invention, an optical fiber comprises a rare earth ion doped core having a center axis, where the refractive index is lowest along the center axis and initially increases with radial distance from the center axis. The optical fiber also comprises a clad layer having an axis collinear with the center axis having an inner portion adjacent to an outer periphery of the core and having a refractive index less than the refractive index at the outer periphery of the core, whereby the difference in refractive index between the outer periphery of the core and the clad layer is sufficient to confine electromagnetic field within a selected wavelength substantially only to the core. The clad layer also comprises at least one outer portion. Preferably, the outer portion of the clad layer has a larger index of refraction than does the inner portion of the clad layer. The optical fiber also has a mode field diameter of less than 7 μm at the wavelength of 1550 nm. Preferably the selected wavelength range is 1560 nm to 1640 nm.

According to another embodiment of the present invention, an optical fiber comprises a core doped with phosphorus and erbium to a level sufficient to provide optical amplification with a center axis, where the refractive index of the core is lowest along the center axis and initially increases with radial distance from the center axis, the concentration of phosphorus in the core initially increases with radial distance from the center axis; the core has an outer radius in the range of 2 μm to 6 μm. The optical fiber also comprises a clad layer with an axis collinear with the center axis, an inner portion adjacent to an outer periphery of the core, and at least one outer portion, where the refractive index of the inner portion of the clad layer is less than the refractive index at the outer periphery of the core and the inner portion of the clad layer is sufficient to confine electromagnetic field within a wavelength range of 1560 nm to 1640 nm to substantially only the core; the inner portion has an inner radius and an outer radius and the difference $r_2-r_1$ is in the range of $2r_1$ to $5r_1$; and the clad layer includes at least one dopant selected from the group consisting of boron and fluorine. Preferably the optical fiber has an absorption of at least 20 dB/meter. Also preferably, the optical fiber has a mode field diameter of not more than 7 μm at the wavelength of 1550 nm.

Other advantages and innovations of the present invention will become apparent to those skilled in the art from the detailed description which follows and the accompanying figures. Furthermore, the preceding summary and the following description are illustrative only and do not restrict the present invention as claimed.

BRIEF DESCRIPTION OF THE DRAWINGS

The accompanying drawings which are incorporated herein form part of the specification, illustrate embodiments of the present invention and, together with the description, further serve to explain the principles of the invention and to enable a person skilled in the pertinent art to make and use the invention.

DETAILED DESCRIPTION OF THE PREFERRED EMBODIMENTS

The present invention is generally related to the field of optical fibers, and is related in particular to a refractive index profile of a phosphorus- and rare earth- (such as erbium or ytterbium) doped fiber. The optical fiber of the present invention comprises a core and a clad layer. The clad layer contains an inner portion and an outer portion. The inner portion of the cladding is depressed, i.e., it has a reduced index of refraction relative to the outer portion, which increases the effective index of the core of the fiber. The increased effective index acts to substantially confine the optical mode to the core. Thus, the centerline dip may be compensated by the depressed cladding.

Figure 1:
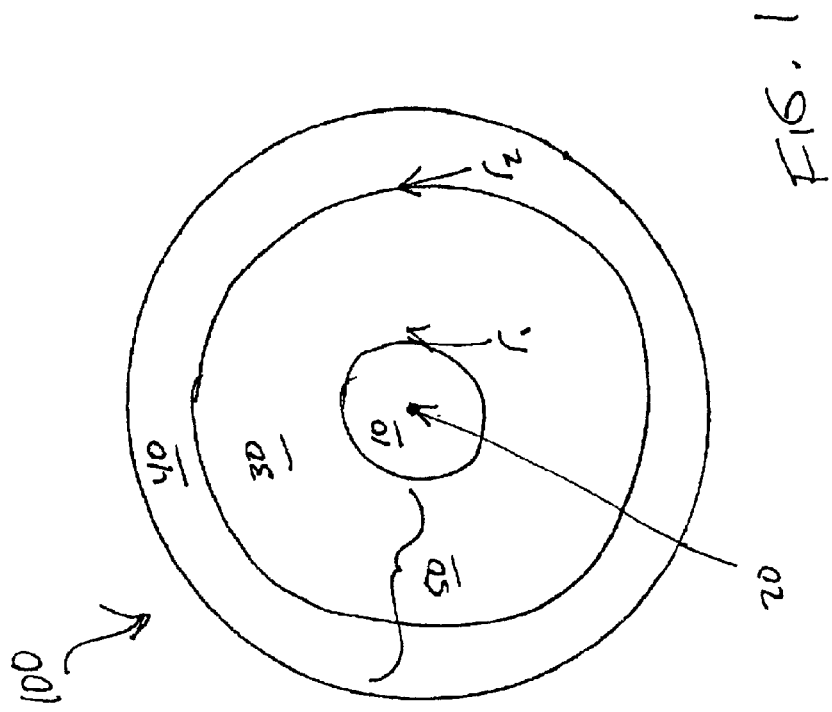
FIG. 1 shows a profile of a fiber according to an embodiment of the present invention.

FIG. 1 shows a cross-section of an optical fiber 100 according to one embodiment of the present invention. The fiber 100 has a core 10 and a clad layer 50. The clad layer comprises an inner portion 30 with an inner radius $r_1$ and an outer portion 40 with an inner radius $r_2$. The inner radius of the inner portion 30 is of course the outer radius of the core 10. The core 10 may be a standard, silica-based core.

The core 10 is doped with a rare earth ion, such as ytterbium or erbium, and phosphorus, or a combination of ions. The concentration of the rare earth ion or ions in the core should be sufficient so that the fiber can act as a gain media for amplifiers. For example, the core 10 can comprise 0.2 to 0.4% $Er_2O_3$ by weight and at least 20% $P_2O_5$ by weight. In the clad layer 50, the refractive index of the outer portion 40 is greater than that of the inner portion 30, which can be seen in FIG. 2. The desired refractive index profile of the clad layer 50 can be implemented through fluorine and boron doping, as would be clear to one of ordinary skill in the art upon reading the present disclosure.

The fiber is made using a process which results in the fiber core having a centerline dip in the index of refraction. For example, the fiber may be made using MCVD processes. Details of a typical MCVD process are outlined in U.S. Pat. No. 4,257,797 incorporated herein by reference in its entirety. Due to the MCVD fabrication process, the concentration of phosphorus is low along the centerline and initially increases with radial distance from the centerline, i.e., there is a centerline dip. Because the index of refraction depends on the phosphorus concentration, the index of refraction of the core 10 is low at the centerline 20, and initially, increases with radial distance from the centerline. The centerline dip phenomenon is an artifact of the fiber manufacturing process.

Figure 2:
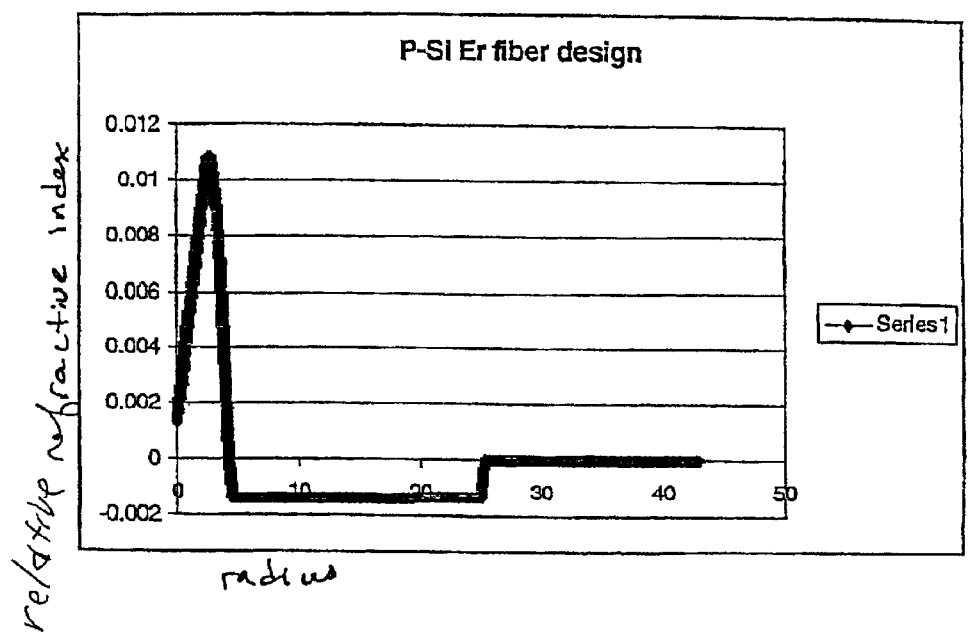
FIG. 2 shows a graph of the refractive index profile of a fiber according to an alternative embodiment of the present invention.

FIG. 2 shows an example of the refractive index of an optical fiber 100 as a function of radius. In other words, it shows the refractive index profile. The profile shown in FIG. 2 has both a centerline dip and depressed inner portion 30 of the clad layer 50.

The centerline dip is quite evident in FIG. 2. The refractive index along the centerline is approximately 1.444 and rises dramatically to approximately 1.45 at a radial distance of about 3 Tm. This raise is shown in FIG. 2 which indicates delta difference of approximately 0.01 from th cor center to the peak of the curve. Of course, the profile is not limited to these particular parameters, and may have other parameters that provide a center line dip. The lower relative refractive index of the core 10 in the embodiment of FIG. 2 is about 1.442 and coincides with the inner portion 30 of the clad layer 50.

Beneficially, the depressed inner portion 30 compensates for the centerline dip. This depression of the refractive index of the inner portion 30 functions to increase the effective refractive index of the core 10, thereby increasing confinement of the propagating electromagnetic field within a desired wavelength range to the core region. Thus, the optical mode may be confined to substantially only the core, which the core may be of a sufficiently small size to allow for good ER absorption and optical gain over a larger wavelength range. For example, the desired wavelength range over which a sufficient gain is possible may be from about 1560 to about 1625 nm.

In this exemplary embodiment, the inner portion 30 ranges from about 5 μm to about 25 μm, where the outer portion 40 begins. The outer radius $r_1$ of the core 10 may fall in the range of 2 μm to 6 μm. The inner radii $r_1$ and $r_2$, of the inner and outer portions 30 and 40 respectively, as well as the particular index of refraction of these portions will depend upon the particular application of the fiber. For example, the difference between $r_1$ and $r_2$ may fall within the range of $2r_1$ to $5r_1$.

Preferably, the refractive index of the inner portion 30 of the clad layer 50 may fall within the range of 1.430 to 1.444. For example, the refractive index of the inner portion 30 may be about 1.441.

Figure 3:
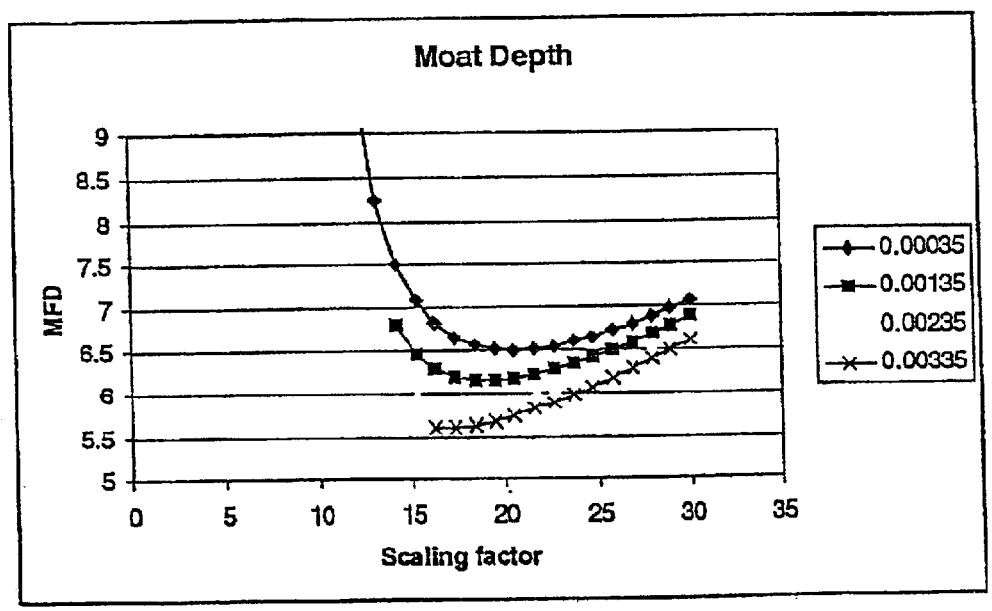
FIG. 3 shows the relationship of the index of the inner cladding and fiber mode field diameter (MFD) at the wavelength of 1550 nm. It illustrates that the lower the inner cladding index, the smaller the minimum MFD.

FIG. 3 shows the mode field diameter (MFD) as a function of scaling factor for four different refractive indexes of the inner portion 30 of the clad layer. The scaling factor is directly proportional to the outer radius of the core, $r_1$. The plotted curves illustrate that the optimum core radius $r_1$ can be determined by choosing a suitable mode field diameter for a given refractive index, as would be apparent to one of ordinary skill in the art given the present description.

Figure 4:
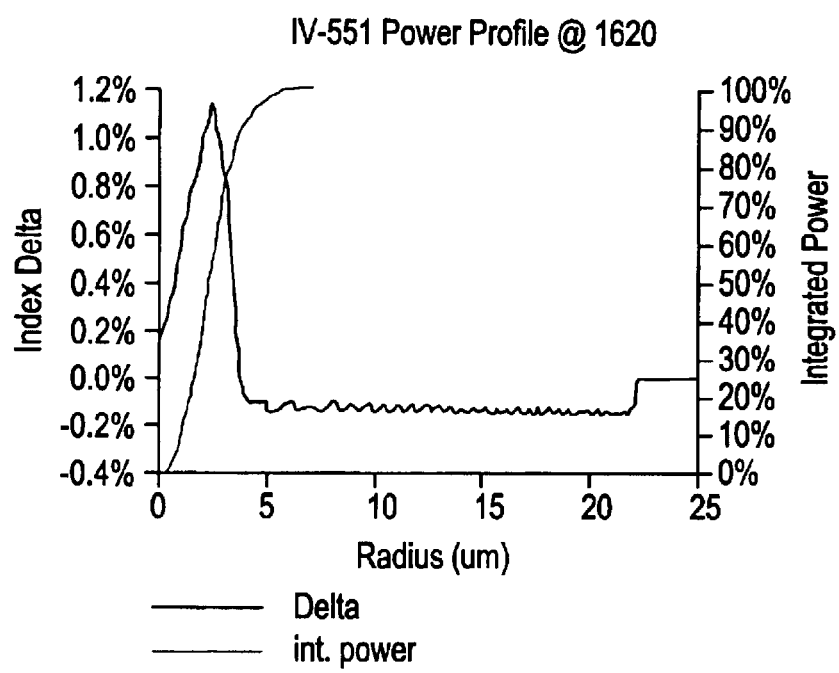
FIG. 4 shows a graph of the power profile of a fiber according to an alternative embodiment of the present invention.

FIG. 4 shows the optical power distribution of the fiber with depressed cladding. The integrated optical power is shown as a function of radius. The mode field diameter MFD, as shown in this figure is approximately 7 $\mu$m. The mode field diameter is diameter where radiation intensity I is at least $I_{max}/e^2$. For example, for index profile without the moat, 68% of the optical power is continued in the core, for the 60.235% moat is added to the index profile the optical power confinement is increased to 77%.

As the person of skill in the art will appreciate, the use of a depressed inner portion 30 with a phosphorus-doped core can lower the mode field diameter of the fiber of approximately 7 $\mu$m, thus increasing the intensity of the mode in the core and resulting in an optical fiber for amplification with extended gain capabilities, high power efficiency, and low noise.

As illustrated in this description, the refractive index profile of this fiber is preferably determined by the phosphorus doping in the core, however, other embodiments could include for example, Ge or B dopants.

The optical fiber of the present invention can be fabricated using a modified MCVD process. A specific example is now described. A silica tube is provided on an MCVD lathe. A glass layer with the same refractive index as the silica inside the tube is then formed by depositing and sintering. Glass layers with a depressed index of refraction are formed by depositing and sintering on top of the initial glass layers.

A P—Si layer is deposited and sintered on top of the depressed index layer. A silica soot layer is deposited on top of the P—Si layer, and the tube is removed from the MCVD lathe and placed vertically. A pre-made solution, containing all desired dopants, for example P, Er, Yb and Al is made to flow through the tube from the bottom, and the soot layer is soaked in the solution for approximately 15 to 30 minutes. The solution is drained from the tube, and the tube is allowed to air dry for approximately 30 minutes, after which the tube is reinstalled on the lathe. $Cl_2/POCl_3$ gas is made to flow inside the tube and the tube is dried for approximately one more hour at about 800° C.

After this chemical drying, the now doped soot layer is sintered and the tube is collapsed into the glass rod (preform). This collapse stage includes three forward collapse and one backwards collapse steps. The temperature of the tube during the collapse stage is ideally maintained between about 2200° C. and 2300° C. Finally, the preform is overcladded and drawn into fiber.

While the above provides a full and complete disclosure of the preferred embodiments of the present invention, various modifications, alternate constructions, and equivalents may be employed without departing from the scope of the invention. Therefore, the above description and illustration should not be construed as limiting the scope of the invention, which is defined by the appended claims.

We claim:

1. An optical fiber for signal amplification comprising:
    a core having a center axis, the core being doped with at least 15% phosphorus by weight and at least one rare earth ion to a level sufficient to provide optical signal amplification; and
    a clad layer surrounding the core, having an axis collinear with the center axis, an inner portion and an outer portion, wherein:
    the inner portion is adjacent to an outer periphery of the core; and
    the refractive index of the inner portion is less than the refractive index at the outer periphery of the core, whereby the difference in refractive index between the outer periphery of the core and the clad layer is sufficient to confine electromagnetic radiation within a selected wavelength range substantially only to the core.

2. The optical fiber according to claim 1, wherein the phosphorus dopant in the core is at least 20% by weight.

3. The optical fiber according to claim 1, wherein the at least one rare earth ion includes erbium.

4. The optical fiber according to claim 3 containing 0.2 to 0.4% of $Er_2O_3$ in said core by weight.

5. The optical fiber according to claim 1, wherein the at least one rare earth ion includes ytterbium.

6. The optical fiber according to claim 1, wherein said outer portion has a refractive index that is larger than the refractive index of the inner portion.

7. The optical fiber according to claim 1, wherein the selected wavelength range is within about 1560 nm to about 1640 nm.

8. The optical fiber according to claim 1, wherein the inner portion of the clad layer has an inner radius $r_1$ and an outer radius $r_2$, and the difference $r_2-r_1$ is in the range of $2r_1$ to $5r_1$.

9. The optical fiber according to claim 1, wherein the core has an outer radius $r_1$ in the range of 2 $\mu$m to 6 $\mu$m.

10. The optical fiber according to claim 1, wherein the refractive index of the inner portion of the clad layer is in the range of 1.430 to less than 1.444.

11. The optical fiber according to claim 10, wherein the refractive index of the inner portion of the clad layer is about 1.440 to 1.442.

12. The optical fiber according to claim 11, wherein the refractive index of the inner portion of the clad layer is about 1.441.

13. The optical fiber according to claim 4, wherein the clad layer includes at least one dopant, wherein the at least one dopant includes at least one element selected from the group consisting of boron and fluorine.

14. The optical fiber according to claim 1, wherein the refractive index of the core is lowest along the center axis and initially increases with radial distance from the center axis.

15. The optical fiber according to claim 14, wherein the concentration of phosphorus in the core is lowest along the center axis and initially increases with radial distance from the center axis.

16. An optical fiber comprising:
    a rare earth ion doped core having a center axis, wherein the refractive index is lowest along the center axis and initially increases with radial distance from the center axis; and a clad layer having an axis collinear with the center axis, an inner portion, and at least one outer portion, wherein:

the inner portion is adjacent to an outer periphery of the core; and the refractive index of the inner portion is less than the refractive index at the outer periphery of the core, whereby the difference in refractive index between the outer periphery of the core and the clad layer is sufficient to confine electromagnetic radiation within a selected wavelength range to substantially only the core, wherein said optical fiber has an absorption of at least 20 dB/meter.

17. The optical fiber according to claim 16, wherein the optical fiber has a mode field diameter of less than 7μm.

18. The optical fiber according to claim 16, wherein the selected wavelength range is 1560 nm to 1640 nm.

19. The optical fiber according to claim 16, wherein the inner portion has an inner radius $r_1$ and an outer radius $r_2$ and the difference $r_2-r_1$ is in the range of $2r_1$ to $5r_1$.

20. The optical fiber according to claim 16, wherein the core has an outer radius in the range of 2 μm to 6 μm.

21. The optical fiber according to claim 16, wherein said outer portion of the clad layer has a larger index of refraction that the inner portion of said clad layer.

22. The optical fiber according to claim 16, wherein said core contains 0.2 to 0.4% of $Er_2O_3$ by weight.

23. An optical fiber comprising:

a core having a center axis, the core being doped with phosphorus and erbium to a level sufficient to provide optical amplification, wherein the refractive index of the core is lowest along the central axis and initially increases with radial distance from the center axis;

the concentration of phosphorus in the core initially increases with radial distance from the center axis;

the core has an outer radius in the range of 2 μm to 6 μm; and a clad layer having an axis collinear with the center axis, an inner portion adjacent to an outer periphery of the core and at least one outer portion, wherein:

the refractive index of the inner portion of the clad layer is less than the refractive index at the outer periphery of the core, whereby the difference in refractive index between the outer periphery of the core and the inner portion of the clad layer is sufficient to confine electromagnetic radiation within a wavelength range of 1560 nm to 1625 to substantially only the core;

the inner portion has an inner radius $r_1$ and an outer radius $r_2$ and the difference $r_2-r_1$ is in the range of $2r_1$ to $5r_1$; and the clad layer includes at least one dopant in the clad layer, wherein the at least one dopant includes at least one element selected from the group consisting of boron and fluorine.

24. The optical fiber of claim 23, wherein said optical fiber has an absorption of at least 20 db/meter.

25. The optical fiber according to claim 24, wherein said fiber has a mode field diameter of not more than 7 μm.

* * * * *